United States Patent [19]
Schardt et al.

[11] Patent Number: 6,085,129
[45] Date of Patent: Jul. 4, 2000

[54] INTEGRATED VERTICAL PROFILE DISPLAY

[75] Inventors: Michael T. Schardt; Robert B. Ray; Deborah L. Hardin, all of Cedar Rapids, Iowa

[73] Assignee: Rockwell Collins, Inc., Cedar Rapids, Iowa

[21] Appl. No.: 08/971,082

[22] Filed: Nov. 14, 1997

[51] Int. Cl.[7] .......................... G01C 21/00; G06F 165/00
[52] U.S. Cl. ............................ 701/14; 701/204; 340/971
[58] Field of Search .................................. 701/3, 14, 205, 701/208, 204; 340/971, 973; 73/178 R

[56] References Cited

U.S. PATENT DOCUMENTS

| | | | |
|---|---|---|---|
| 4,952,922 | 8/1990 | Griffin et al. | 340/729 |
| 5,086,296 | 2/1992 | Waruszewski, Jr. | 364/454 |
| 5,111,400 | 5/1992 | Yoder | 364/424.01 |
| 5,227,786 | 7/1993 | Hancock | 340/961 |
| 5,337,982 | 8/1994 | Sherry | 244/186 |
| 5,379,215 | 1/1995 | Kruhoeffer et al. | 364/420 |
| 5,445,021 | 8/1995 | Cattoen et al. | 73/178 R |
| 5,715,163 | 2/1998 | Bang et al. | 701/202 |

OTHER PUBLICATIONS

George, F.; Introducing Primus Epic; Business & Commercial Aviation; Nov. 1996; pp. 116–120.
Scott, W.; Pentium Power 'Epic' Integrated Avionics; Aviation Week & Space Tech.; Nov. 18, 1996.
Ditter, A.; An Epic in the Making; Commuter World; Dec. 1996–Jan. 1997; pp. 16–21.
Holahan, J.; LCDs, Mice on the Flight Deck; Aviation International News; Nov. 1996; pp. 56–58.

*Primary Examiner*—Michael J. Zanelli
*Attorney, Agent, or Firm*—Kyle Eppele; James P. O'Shaughnessy

[57] ABSTRACT

An avionics display unit for use in a flight management system (FMS) of an aircraft, and a method of using the same to increase a pilot's awareness of scheduled changes in operational modes of the aircraft are disclosed. The display unit includes a display device adapted to receive FMS data and to provide a graphical representation of a flight plan for the aircraft relative to a representation of a current position of the aircraft. The display unit is also adapted to provide future mode annunciators, representative of future operational modes of the aircraft, adjacent to positions on the graphical representation of the flight plan at which the future operational modes are scheduled to occur.

5 Claims, 3 Drawing Sheets

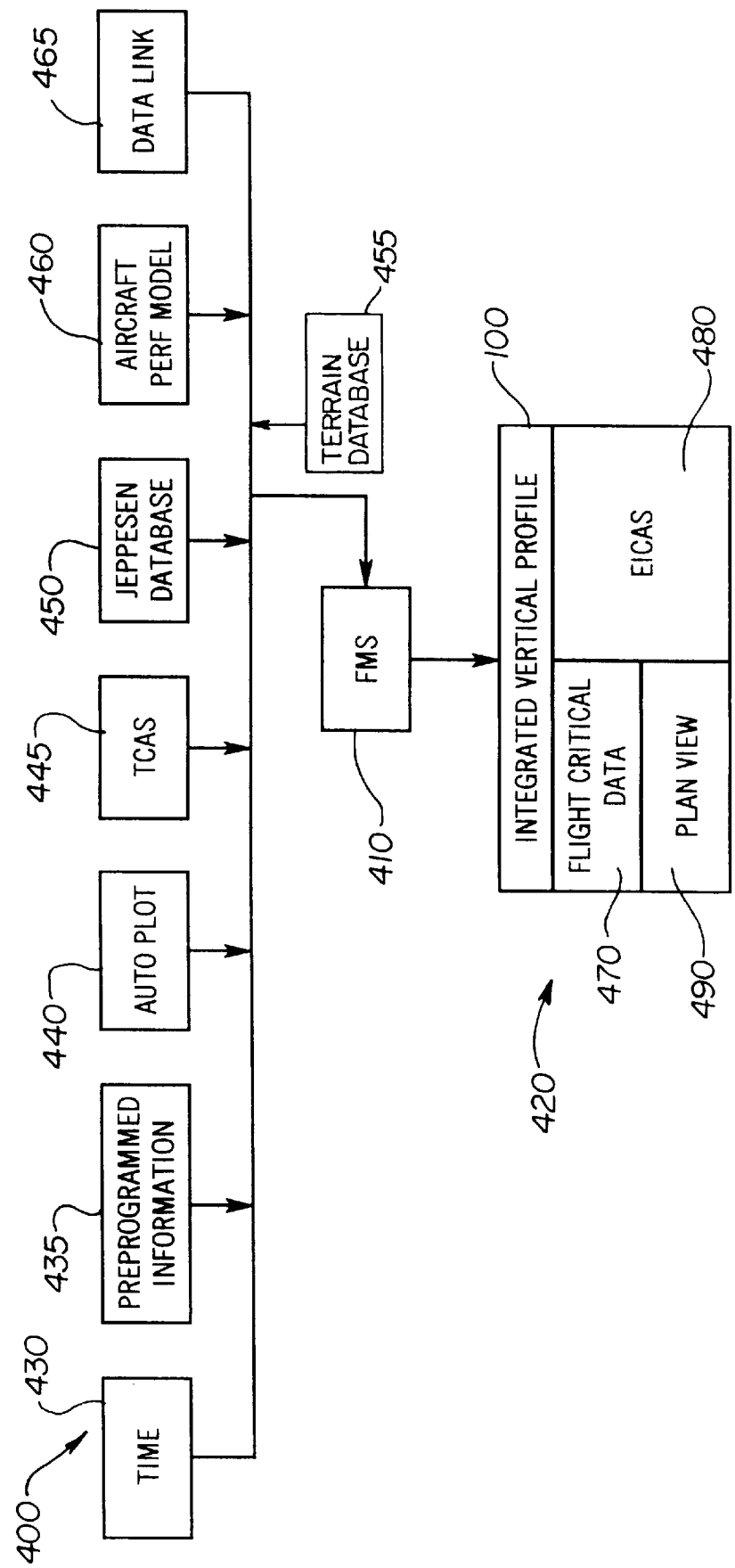

INTEGRATED VERTICAL PROFILE DISPLAY

FIELD OF THE INVENTION

The present invention relates generally to aviation electronics (avionics) displays. More particularly, the present invention relates to an avionics display which integrates a graphical representation of the aircraft vertical profile with operational mode annunciation to provide optimized pilot situational awareness.

BACKGROUND OF THE INVENTION

Aircraft avionics systems include automatic flight controls and other systems to aid the pilot in navigation of the aircraft. Typically, a primary flight display (PFD) provides the pilot an indication of the current modes of operation of the aircraft. For example, above the altitude scale on the PFD a normally static alphabetic representation is given of one or more of the vertical navigational mode, the speed or throttle mode and the lateral navigational mode for the aircraft. These representations are frequently referred to as mode annunciation. Examples of vertical navigational modes of operation include altitude hold (ALT), altitude select (ALTS), glideslope (GLS), and vertical navigation (VNAV). Examples of lateral navigational modes of operation include flight management system (FMS), VHF omni-direction radio (VOR), localizer (LOC), distance measuring equipment (DME), microwave landing system (MLS), and global positioning system (GPS) modes. Examples of throttle modes include speed (SPD) and time navigation (TNAV).

A fundamental problem facing pilots is maintaining situational awareness of the aircraft and knowing what actions the automatic flight control system will require next. In conventional flight control systems, changes in operational modes or other events such as passing over a marker beacon have been annunciated by causing some text to flash for a few second beginning at the appropriate moment. Prior to occurrence of the event and the resulting flashing of the text, awareness that the event is upcoming is difficult since all the pilot sees is a static text annunciation. Lack of situational awareness can be a particular problem in controlled flight into terrain, thus causing the pilot to miss the airport by a significant distance.

Consequently, an avionics display which overcomes these and other problems by providing the pilot with improved situational awareness of upcoming events and modes of operation would be a significant improvement in the art.

SUMMARY OF THE INVENTION

An avionics display unit for use in a flight management system (FMS) of an aircraft, and a method of using the same to increase a pilot's awareness of scheduled changes in operational modes of the aircraft are disclosed. The display unit includes a display device adapted to receive FMS data and to provide a graphical representation of a flight plan for the aircraft relative to a representation of a current position of the aircraft. The display unit is also adapted to provide future mode annunciators, representative of future operational modes of the aircraft, adjacent to positions on the graphical representation of the flight plan at which the future operational modes are scheduled to occur.

BRIEF DESCRIPTION OF THE DRAWINGS

The invention may be more fully understood by reading the following description of a preferred embodiment of the invention, in conjunction with the appended drawings wherein:

FIG. 4 is a block diagram of an avionics system, in accordance with the present invention, which provides the integrated vertical profile illustrated in FIGS. 1–3.

DETAILED DESCRIPTION OF THE PREFERRED EMBODIMENTS

Figure 1:
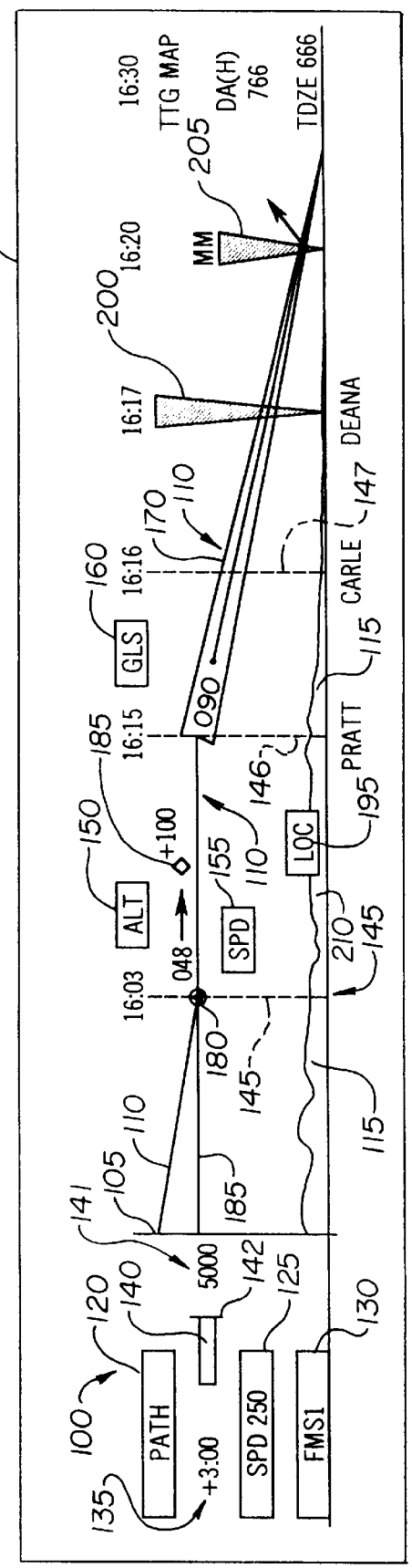
FIG. 1 is a view of an avionics display device displaying an integrated vertical profile which combines a graphical representation of the aircraft flight plan with operational mode annunciation in order to improve the pilot's situational awareness.

FIG. 1 is a diagrammatic view of an avionics display device 50 displaying an integrated vertical profile 100 which combines a graphical representation of the aircraft flight plan or path with operational mode annunciation. Combining mode annunciation with the aircraft flight plan such that changes in future planned operational mode are displayed along the flight plan, and are thereby correlated to the planned positions and time management information (target times) of the aircraft, improves the pilot's situational awareness.

Current position line 105 represents the current position of the aircraft in which display 50 is installed. In the representation, terrain map 115, scheduled flight plan or path 110 and other flight data and mode annunciators move from the right of the display toward the position of the plane indicated at current position line 105 at the left of the display.

Boxes 120, 125 and 130 on the far left of integrated vertical profile 100 indicate to the pilot the current or active flight control modes. Box 120 contains the active vertical mode annunciator PATH. Box 125 contains the active throttle mode annunciator SPD 250. Box 130 contains the active lateral mode annunciator FMS1.

In between vertical mode annunciator box 120 and throttle mode annunciator box 125 is a numeric indicator 135 which represents the amount of time in minutes and seconds that the aircraft will arrive early or late at flight plan position 145. Next to numeric indicator 135 is graphical indicator 140 representing the same information as numeric indicator 135. As depicted, with the aircraft at the position represented by current position line 105, the aircraft is three minutes ahead of the 16:03 target time of arrival at position 145 along the scheduled flight path 110. If the aircraft were behind schedule, numeric indicator 135 would be a negative number and the bar of graphical indicator 140 would extend to the right of line 142. Informing the pilot of this time management information in an easily comprehended manner is important because the pilot must not only manage the speed and energy of the aircraft, but must also be concerned with arrival times to avoid other aircraft which are scheduled along conflicting paths at different times.

Adjacent to graphical time management indicator 140 is altitude select number indicator 141. The value of indicator 141, which is 5,000 as illustrated, is the planned or target altitude. Typically in the past, this number would have been located over the altitude tape in a PFD. However, in the prior art, no indication that the aircraft was nearing capture of the target altitude was provided to the pilot. Preferred embodiments of the present invention include a graphical representation of where the altitude floor or ceiling is relative to the current altitude of the aircraft.

As mentioned above, across the top of integrated vertical profile 100 is a line of time management numbers including by way of example 16:03, 16:15, 16:16, 16:17, 16:20 and 16:30. These numbers indicate the scheduled or planned times of arrival at various locations along the flight plan or path. Dotted lines 145, 146 and 147 extending to terrain map 115 correlate the corresponding scheduled times to earth locations along the flight plan or path.

Adjacent to some of the time management numbers is the vertical mode annunciation for the vertical mode that is expected to occur at that point. Since in the illustrated example the path of the aircraft is descending and converging on the target altitude 185 at the scheduled time of 16:03, at that point the flight plan is to have the flight control system capture the altitude and maintain it (represented by vertical mode ALT annunciator 150). As the aircraft travels from its illustrated current position toward the position corresponding to scheduled time 16:03, the terrain, time representations, and mode annunciators will slide toward the left of the display. The ALT vertical mode annunciator 150 will eventually become the active vertical mode and replace PATH in the vertical mode box 120 on the far left of the display. Likewise, throttle vertical mode SPD annunciator 155 will become the active throttle mode annunciator and will be displayed in box 125.

Also underneath the scheduled time 16:03 is a range-to-altitude indicator 180 which illustrates a prediction of when and where the aircraft will arrive at the target altitude of 5,000 feet represented graphically by line 185. The altitude indicator 180 moves within integrated vertical profile 100 to show the pilot where the aircraft will be when the target altitude is achieved.

The traffic alert and collision avoidance system (TCAS) traffic indicator 185 shows air traffic along the planned route. The indicator 185 includes a graphical representation of the position of the air traffic along the flight plan, combined with a numeric representation of the height of the air traffic relative to the aircraft's current altitude. In an approach scenario, there is typically staggered traffic landing at the airport. The TCAS indicator 185 also moves along the display relative to current position line 105 to represent changes in the air traffic relative position. As illustrated in FIG. 1, the air traffic is ahead of the aircraft and is 100 feet above the aircraft's current elevation.

As the pilot of the aircraft looks to the right of integrated vertical profile 100, he or she sees progressing target arrival times correlated to some point on the surface of the earth and correlated to any other operational or navigational modes that are expected. For example, the next target time represented is 16:15, and next to it is the vertical mode of glideslope (GLS) annunciator 160, which is another automatic flight control vertical mode of operation. At that point, because of the information provided in profile 100, the pilot will be expecting to converge on the glideslope beam 170.

Below the level of the throttle mode indicators or annunciators such as the SPD annunciator 155, the terrain and earth reference points (PRATT, CARLE AND DEANA for example) are represented. At the same level, the lateral or navigational mode annunciators such as LOC annunciator 195 are positioned. The illustrated embodiment of the present invention does not depict lateral deviation off of the planned path. Instead, it is designed to improve situational awareness relative to the vertical profile of the planned mission. As illustrated, the precision landing system in this case has both the glide slope (GLS) mode which dictates the approach angle to the airport, and a localizer (LOC) which gives the system the approach position left or right of the runway.

Integrated vertical profile 100 provided by display 50 includes cones 200 and 205 which are graphical representations of the locations of outer and middle marker beacons. Since the marker beacons are positioned at fixed locations along the earth, cone graphical representations 200 and 295 move with the flight plan. This is an improvement over many prior art systems in which a text representation of the aircraft passing over a beacon is provided, but is not integrated with a moving graphical representation of the flight plan. In preferred embodiments, cones 200 and 205 will blink when the aircraft gets over the corresponding location.

Figure 2:
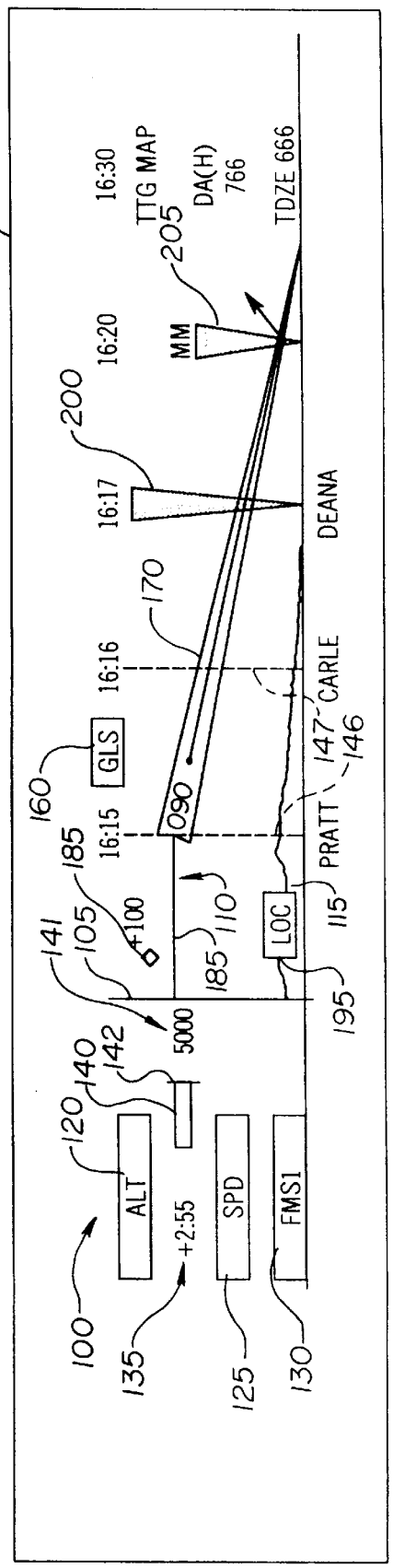
FIG. 2 is a view of the avionics display device illustrated in FIG. 1, with the integrated vertical profile representing flight plan and operational mode information for an aircraft position subsequent to the one illustrated in FIG. 1.

FIG. 2 is a diagrammatic view of avionics display device 50 generating the integrated vertical profile 100 representing flight plan and operational mode information for an aircraft position subsequent to the position illustrated in FIG. 1. In FIG. 2, the position of the aircraft is approximately over ground position 210 (illustrated in FIG. 1 only). Therefore, the vertical ALT mode annunciator 150 has become the active vertical mode and is displayed in vertical mode box 120. Likewise, the vertical SPD mode annunciator 155 has become the active throttle mode displayed in throttle mode box 125. The active lateral mode box 130 has not yet changed to display lateral mode LOC annunciator 195. Numeric indicator 135 and graphical indicator 140 have been updated to represent any changes in the time that the aircraft is ahead or behind schedule. Thus, the pilot has at his or her disposal an integrated display format which readily and clearly correlates current and future operational mode representations or annunciations with positions along the scheduled flight path. The display format also correlates the mode information with future time management or target arrival information. This display format provided in the integrated vertical profile 100 by display device 50 thereby greatly increases the pilot's awareness of the upcoming situations facing the aircraft.

Figure 3:
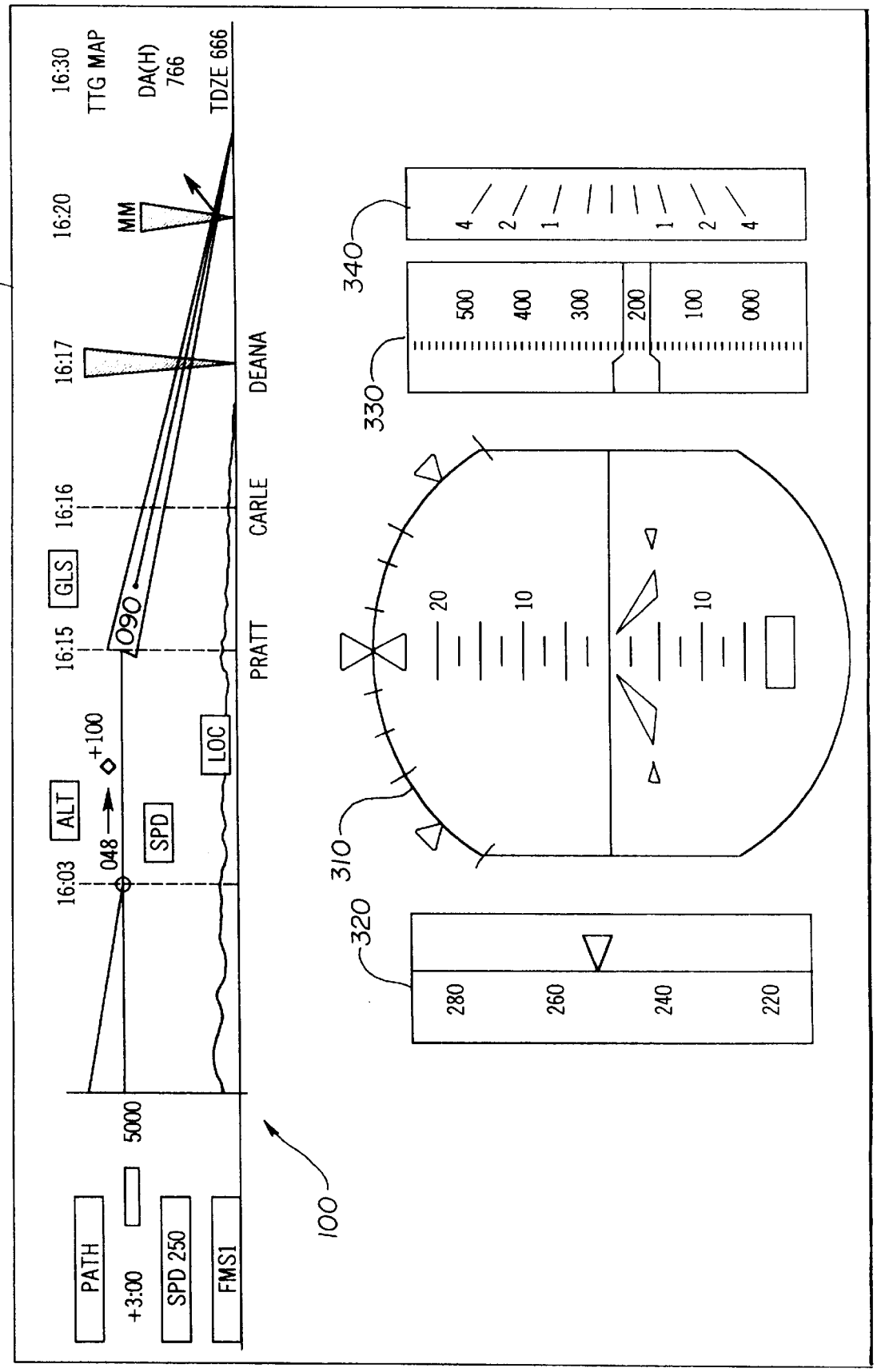
FIG. 3 is a view of an avionics display device combining the integrated vertical profile illustrated in FIGS. 1 and 2 with airspeed, attitude, altitude and vertical speed in a typical PFD format.

FIG. 3 is a diagrammatic view of an avionics display device 300 combining the integrated vertical profile 100 illustrated in FIGS. 1 and 2 with typical PFD display features. By way of non-limiting example, PFD display device 300 generates integrated vertical profile 100 at the top of the display above PFD attitude scale 310, air speed indicator scale 320, altitude scale 330 and vertical speed indicator scale 340. It must be noted that profile 100 can be generated at other locations by PFD 300. Also, the profile 100 can instead be generated by other display devices or systems such as a multi-function display (MFD) device.

FIG. 4 is a block diagram illustrating avionics system 400 which is an example of a typical avionics system adapted to display the integrated vertical profile 100 of the present invention. System 400 includes flight management system 410 which generates the information to be displayed on PFD 420. In the particular example illustrated, FMS 410 receives inputs from a time source 430, pre-programmed information storage 435, autopilot 440, TCAS 445, Jeppeson or Arinc 424 database 450, terrain database 455, aircraft performance model database 460, and data link 465. FMS 410 generates information and control signals which cause PFD display device 420 to generate, for example, integrated vertical profile 100, flight critical data 470, engine indication and crew alerting systems (EICAS) 480, and plan view 490 of flight information.

The present invention provides enhanced situational awareness by displaying the planned mode annunciators relative to the temporal and physical flight plan of the aircraft. The present invention includes integration of a vertical profile moving map display that graphically integrates terrain, TCAS, vertical profile of aircraft energy management, action points, autopilot modes and time of action point arrival and/or autopilot modes captured. In the examples provided, the moving map moves from right to left showing that the aircraft is represented as moving from left to right. As the aircraft moves along and encounters an autopilot mode, the mode is captured and is displayed as the current autopilot mode. Action points such as level offs, start climb, and start descent are also depicted as is the associated expected times that these actions should occur. The graphical representation also displays aircraft energy management (vertical profile) to allow for close monitoring of climbs and descents. Pilot input can be made to the climb or descent profile to maintain flexibility and the ability to respond to in-flight changes. Situational awareness is also enhanced by the integrated display of terrain and traffic via TCAS. In some embodiments, terrain is displayed as a profile along the intended flight path of the aircraft.

Although the present invention has been described with reference to preferred embodiments, workers skilled in the art will recognize that changes may be made in form and detail without departing from the spirit and scope of the invention.

What is claimed is:

1. An avionics display unit for use in an aircraft, the display unit comprising:

a display device adapted to receive flight management system (FMS) data and to provide a graphical representation of a flight plan for the aircraft relative to a representation of a current position of the aircraft, wherein the display device is also adapted to provide future mode annunciators, representative of future operational modes of the aircraft, adjacent to positions on the graphical representation of the flight plan at which the future operational modes are scheduled to occur;

wherein the display device is further adapted to move the graphical representation of the flight plan and the future mode annunciators relative to the representation of the current position of the aircraft as the current position of the aircraft changes, thereby providing the pilot with an indication of upcoming changes in the operational mode of the aircraft;

wherein the operational modes of the aircraft include at least one of vertical navigational modes, lateral navigational modes, and throttle modes; and wherein the display device is further adapted to provide, adjacent to particular portions of the graphical representation of the flight plan, representations of scheduled times of arrival of the aircraft at corresponding positions along the flight plan, and thereby providing a display output which correlates the upcoming changes in the operational mode of the aircraft to scheduled arrival times.

2. The avionics display device of claim 1, wherein the display device is further adapted to provide current mode annunciators, representative of current operational modes of the aircraft, adjacent to the representation of the current position of the aircraft.

3. The avionics display device of claim 1, wherein the display device is adapted to cause the future mode annunciators to replace the current mode annunciators when the current position of the aircraft changes such that it corresponds to the positions on the flight plan at which the future operational modes are scheduled to occur.

4. The avionics display device of claim 3, wherein the display device is further adapted to provide a representation of the terrain along the flight plan.

5. The avionics display device of claim 4, wherein the display device is further adapted to provide a representation of a position of air traffic relative to the representation of the current position of the aircraft and relative to the graphical representation of the flight plan.

* * * * *